(12) United States Patent
Kertesz et al.

(10) Patent No.: US 7,874,596 B2
(45) Date of Patent: Jan. 25, 2011

(54) CONNECTING ARRANGEMENT WITH END SECTIONS OF TWO FLUID CONDUITS TO BE CONNECTED

(75) Inventors: Janos Kertesz, Hofheim (DE); Gerhard Wachter, Büdingen (DE)

(73) Assignee: Norma Germany GmbH, Maintal (DE)

( * ) Notice: Subject to any disclaimer, the term of this patent is extended or adjusted under 35 U.S.C. 154(b) by 459 days.

(21) Appl. No.: 11/441,495

(22) Filed: May 26, 2006

(65) Prior Publication Data

US 2007/0001458 A1    Jan. 4, 2007

(30) Foreign Application Priority Data

| May 27, 2005 | (DE) | ........................ 10 2005 024 267 |
| Dec. 20, 2005 | (EP) | ................................... 05027825 |
| Apr. 28, 2006 | (EP) | ................................... 06008914 |

(51) Int. Cl.
*F16L 21/00* (2006.01)
(52) U.S. Cl. ....................... 285/417; 285/383
(58) Field of Classification Search ................. 285/417, 285/148.5, 148.3, 148.7, 148.8, 148.9, 148.17, 285/148.28, 294.1, 369, 418, 332, 419, 383
See application file for complete search history.

(56) References Cited

U.S. PATENT DOCUMENTS

| 1,043,806 | A | * | 11/1912 | Dahl ....................... 285/148.18 |
| 2,452,219 | A | * | 10/1948 | Bergvall et al. .............. 285/317 |
| 4,174,125 | A | * | 11/1979 | Wyss .......................... 285/110 |
| 4,229,028 | A | * | 10/1980 | Gray .......................... 285/235 |
| 4,358,140 | A | * | 11/1982 | Jonsson ...................... 285/419 |
| 4,513,996 | A | * | 4/1985 | Jost ............................. 285/110 |
| 6,565,129 | B2 | * | 5/2003 | Surjaatmadja .............. 285/373 |
| 6,893,055 | B2 | * | 5/2005 | Thomas et al. .............. 285/319 |
| 2002/0093198 | A1 | | 7/2002 | Ito et al. |

FOREIGN PATENT DOCUMENTS

| DE | 70 03 244 | 8/1971 |
| DE | 37 02 246 | 3/1988 |
| DE | 197 56 987 | 7/1999 |
| DE | 198 55 674 | 6/2000 |
| EP | 1 378 701 | 1/2004 |
| GB | 1 167 076 | 10/1969 |
| GB | 1 365 151 | 8/1974 |
| JP | 08 145 265 | 7/1996 |
| JP | 2002 295774 | 10/2002 |

\* cited by examiner

*Primary Examiner*—Aaron Dunwoody
(74) *Attorney, Agent, or Firm*—Lucas & Mercanti, LLP; Klaus P. Stoffel

(57) ABSTRACT

A connecting arrangement has end sections of two fluid conduits to be connected to one another and a coupling element having an axis and an outer side surrounding the axis and an inner side surrounding the axis. On the circumference of the end sections first securing ribs extend in the circumferential direction. On the inner side of the coupling element second securing ribs extending in the circumferential direction are provided proximal to each axial end of the coupling element. The coupling element is coaxially coupled to the end sections in the coupled state of the connecting arrangement by being elastically expanded, wherein the second securing ribs lock behind the first securing ribs and the end sections are coupled seal-tightly with one another. The coupling element is a circular cylindrical sleeve that is closed circumferentially.

6 Claims, 6 Drawing Sheets

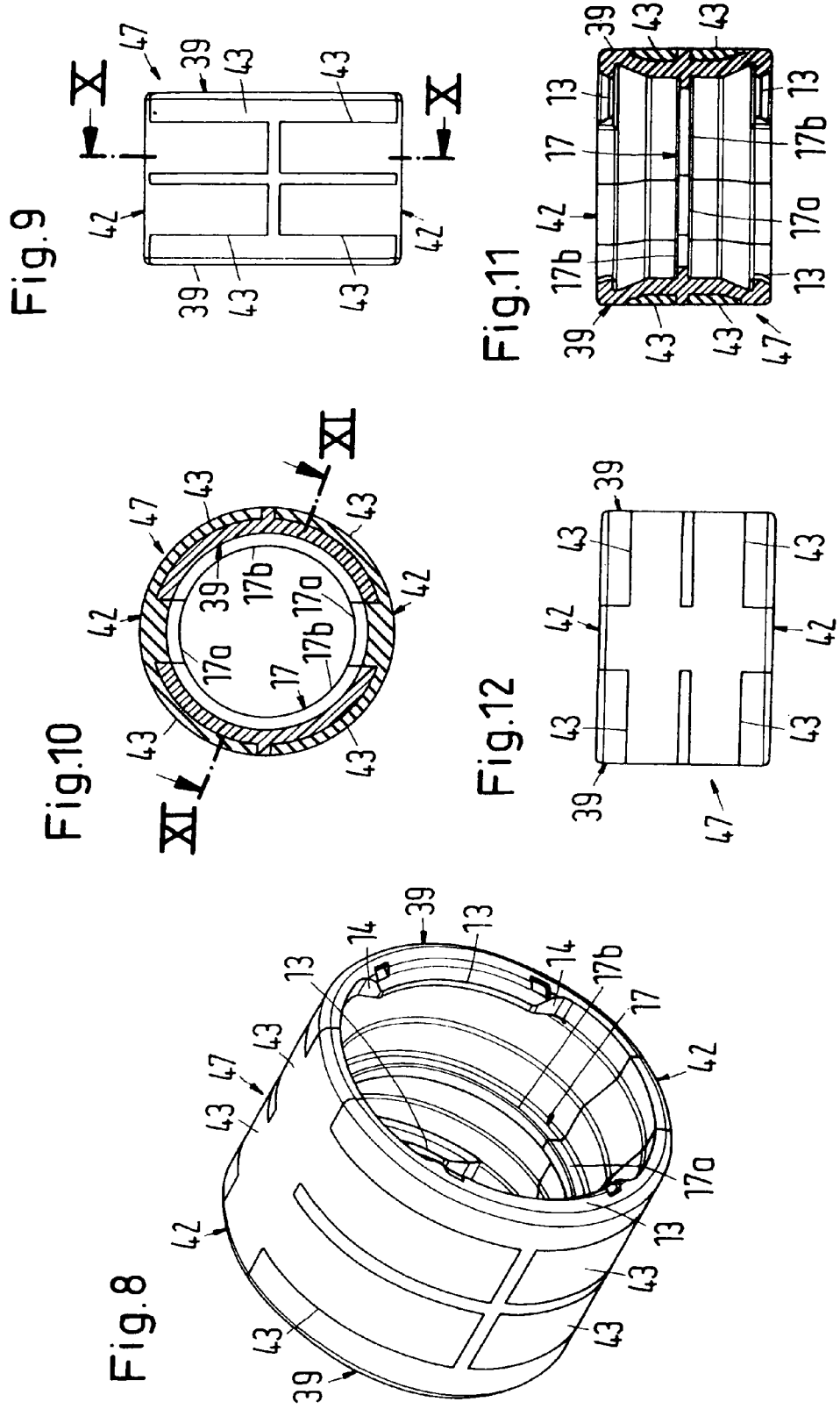

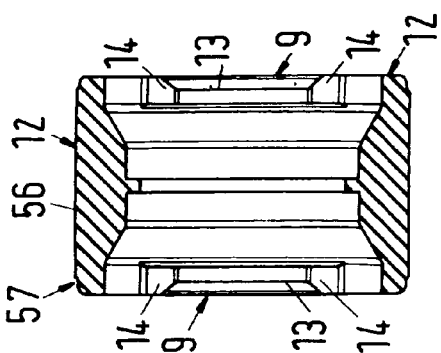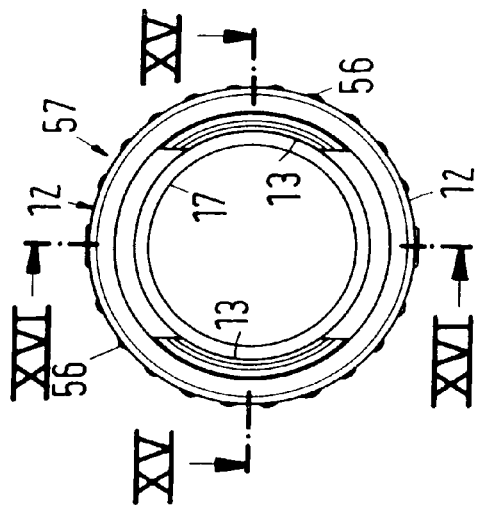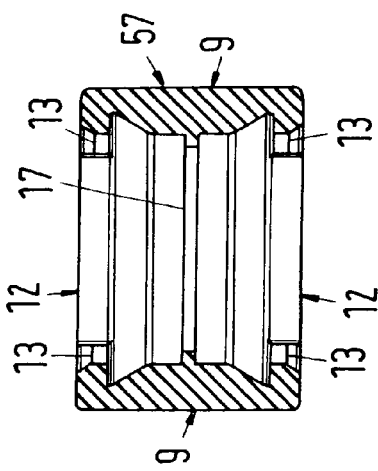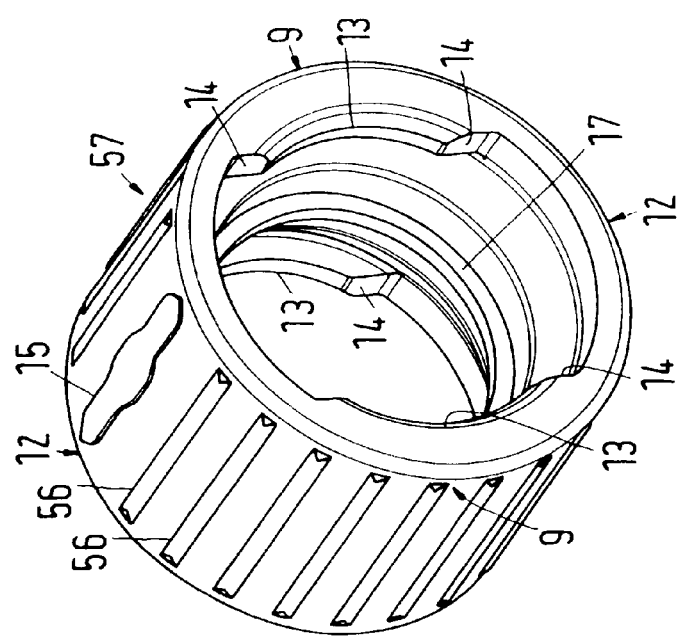

CONNECTING ARRANGEMENT WITH END SECTIONS OF TWO FLUID CONDUITS TO BE CONNECTED

BACKGROUND OF THE INVENTION

1. Field of the Invention

The invention relates to a connecting arrangement comprising end sections of two fluid conduits to be connected to one another and comprising a coupling element having an outer side extending about an axis and an inner side extending about the axis. First securing ribs extend in the circumferential direction about the circumference of the end sections; second securing ribs extend in the circumferential direction on the inner side of the coupling element in the vicinity of each axial end of the coupling element. The coupling element is coaxially coupled by being elastically widened to the end sections and one end section is seal-tightly coupled coaxially to the other end section, wherein the second securing ribs are locked behind the first securing ribs in the coupled position.

2. Description of the Related Art

In a connecting arrangement of this kind disclosed in European patent application 1 378 701 A1, the coupling element is made from an elastic plastic material and is comprised of two oval rings connected to one another by two diametrically opposed stays. The rings are provided internally with securing ribs in the form of locking noses. Upon insertion of the end sections of the fluid conduits into the rings, the rings are elastically widened by means of the securing ribs provided on the end sections until the locking noses of the rings lock behind the securing ribs of the end sections. In the coupled state, there is play between the ring areas having the smaller radius of curvature and the end sections; the play enables radial compression of the rings for decoupling. Because of the wide intermediate spaces between the stays and the play for decoupling between the rings and the end sections, there is the risk that the end sections of the fluid conduits inserted into the coupling element become soiled. This can cause difficulties for repeated coupling and decoupling. Moreover, there is the risk that the connection will become detached when transverse forces in opposite directions are exerted onto the end sections.

SUMMARY OF THE INVENTION

It is an object of the present invention to provide a connecting arrangement of the aforementioned kind that prevents the risk of soiling of the connecting location of the end sections and also prevents accidental decoupling.

In accordance with the present invention, this is achieved in that the coupling element is a circumferentially closed circular cylindrical sleeve.

With this configuration, the sleeve provides an additional sealing action of the connecting location of the end sections in regard to soiling as well as for additional reinforcement of this connecting location in regard to transverse forces.

Preferably, it is provided that the sleeve has bending-resistant sleeve segments that extend about at least 80° and less than 180° in the circumferential direction and have neighboring edges that are connected, respectively, by elastic sleeve segments comprising elastically expandable material by being fused thereto or by forming a monolithic part. The bending-resistant sleeve segments contribute an additional reinforcement of the sleeve and thus of the connecting location of the end sections.

The elastic sleeve segments can overlap the bending-resistant sleeve segments in their circumferential direction with lateral projections, and the projections can be connected by fusing to the bending-resistant sleeve segments. These projections increase the stiffness or strength of the connection between the sleeve segments and enhance grip of the sleeve when handling the sleeve.

On the inner side of the sleeve, a stop rib providing an insertion limitation for the end sections can be arranged circumferentially; one end section rests against the stop rib with its free end and the other end section has a shoulder that rests against the stop rib. The stop rib increases additionally the transverse stiffness of the sleeve and contributes also to the seal-tightness at the connecting location.

Preferably, the stop rib is comprised of rib segments that are formed as monolithic parts of the bending-resistant sleeve segments and monolithic parts of the elastic sleeve segments. At least the rib segments that are monolithic parts of the elastic sleeve segments increase as a result of their elasticity the seal-tightness of the connection.

When the stop rib comprises an elastically expandable material and forms a monolithic part of the elastic sleeve segments, the stop rib increases the seal-tightness of the connection about its entire circumference.

The bending-stiff sleeve segments can have recesses in their exterior side in which recesses an elastically expandable material is embedded. The elastic material embedded in the recesses enhances additionally grip on the sleeve when handling the sleeve.

Also, it can be provided that the stop rib comprising an elastically expandable material is monolithically connected to the elastically expandable material in the recesses through openings provided in the bending-stiff sleeve segments. In this configuration, the stop rib and the elastic expandable material in the recesses can be produced in a single injection molding process.

Alternatively, it can be provided that the sleeve is a monolithic part made from hard rubber or a reinforced and/or crosslinked elastomer. The sleeve can then also be produced in a single injection molding process and is elastic as well as sufficiently bending-resistant.

Instead, it is also possible that the sleeve, including the second securing ribs, comprises an elastically expandable material, that the second securing ribs are spaced apart in the circumferential direction, and that, about the circumferential area of the second securing ribs, cylinder parts made from metal or hard-elastic plastic material and having at their circumferential edges radially inwardly projecting legs are embedded in the elastically expandable material of the sleeve in such a way that the legs project into the second securing ribs. In this configuration of the sleeve, in the area of the cylinder parts comprised of metal or hard-elastic plastic material there are also bending-resistant sleeve segments and between them there are elastic sleeve segments that enable widening of the sleeve for coupling and decoupling the end sections.

In the last embodiment it can also be provided that on the inner side of the sleeve a stop rib for insertion limitation of the end sections extends circumferentially wherein the stop rib comprises the elastically expandable material of the sleeve. The stop rib is then suitable also at the same time for sealing the connecting location of the end sections.

The second securing ribs of the sleeve can extend about at least 80 E and less than 180 E of the sleeve circumference.

Moreover, behind the first securing ribs grooves can be provided in the circumferential direction of the end sections; the axial width of the grooves corresponds to the axial width of the first securing ribs. These grooves enable an insertion limitation of the end sections even when the sleeve has no stop rip and the end section onto which the other end section is pushed when coupling the end section has no stop shoulder. Also, the sleeve can be pre-mounted on one of the end sections in a non-slidable and captive way.

Preferably, it is also provided that behind one of the first securing ribs of one end section on its end facing away from the end of this end section inserted into the sleeve two radially projecting cams are provided diametrically opposite one another relative to the longitudinal center axis of this end section, wherein the two cams project by a radial height that matches a radial height of said first securing rib. These cams enable removal of the end section provided with the cams by manually rotating the sleeve until the securing ribs of this end section of the sleeve are seated on the cams and subsequently pulling this end section out of the sleeve.

In this connection, the first securing ribs should extend about the entire circumference of the end sections.

BRIEF DESCRIPTION OF THE DRAWING

In the drawing:

FIG. 8 is a perspective illustration of another modification of the sleeve according to FIG. 1;

FIG. 9 is a side view of the sleeve according to FIG. 8 on a smaller scale;

FIG. 10 shows the section X-X of FIG. 9;

FIG. 11 shows the section XI-XI of FIG. 10;

FIG. 12 is another side view of the sleeve according to FIG. 8;

FIG. 13 is a perspective view of another modification of the sleeve according to FIG. 1;

FIG. 14 is an axial view of the sleeve according to FIG. 13;

FIG. 15 shows the section XV-XV of FIG. 14;

FIG. 16 shows the section XVI-XVI of FIG. 14;

DESCRIPTION OF THE PREFERRED EMBODIMENTS

Figure 1:
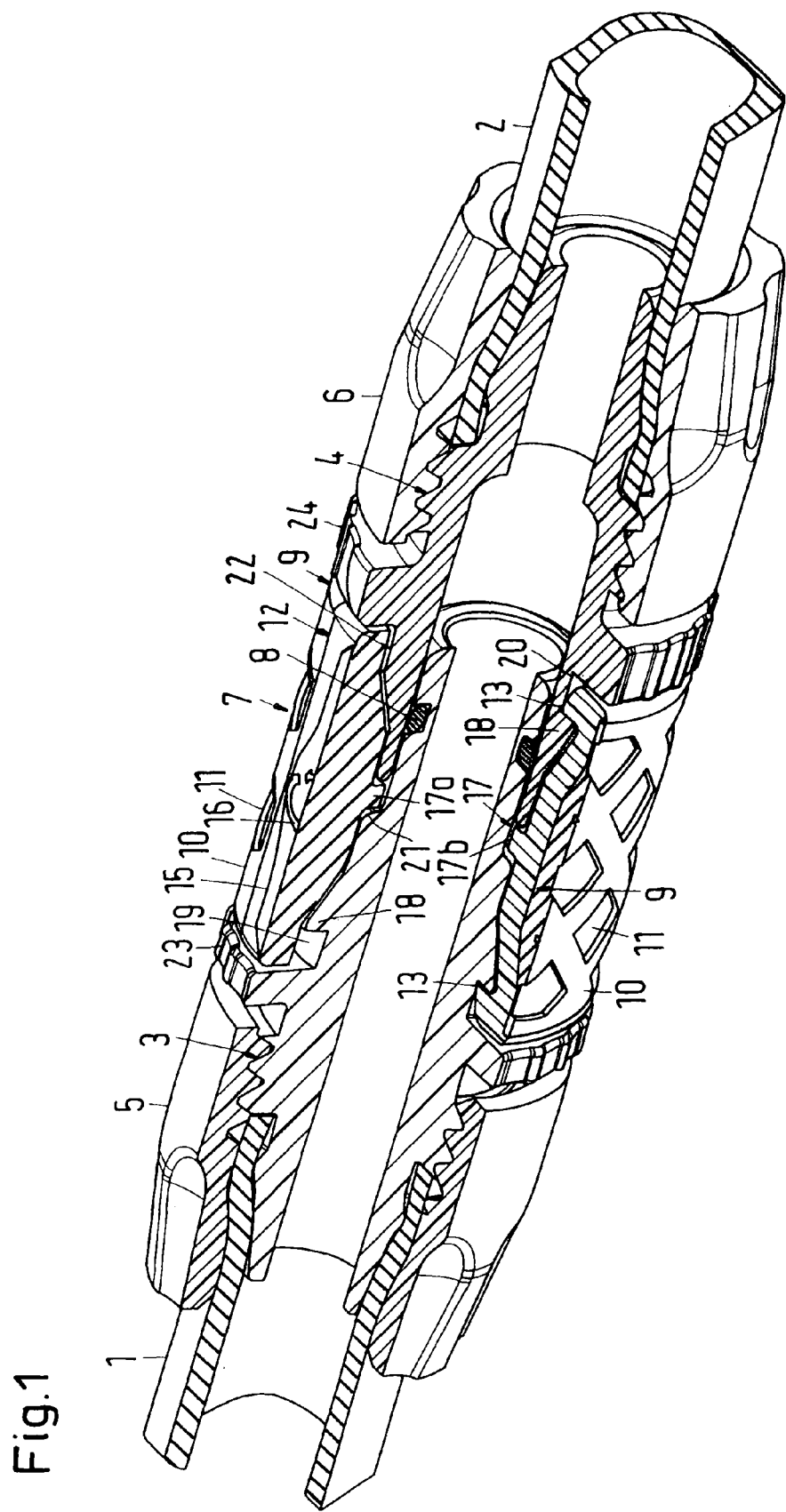
FIG. 1 is a perspective illustration of an embodiment of a connecting arrangement according to the invention in axial section in the coupled state.
Figure 2:
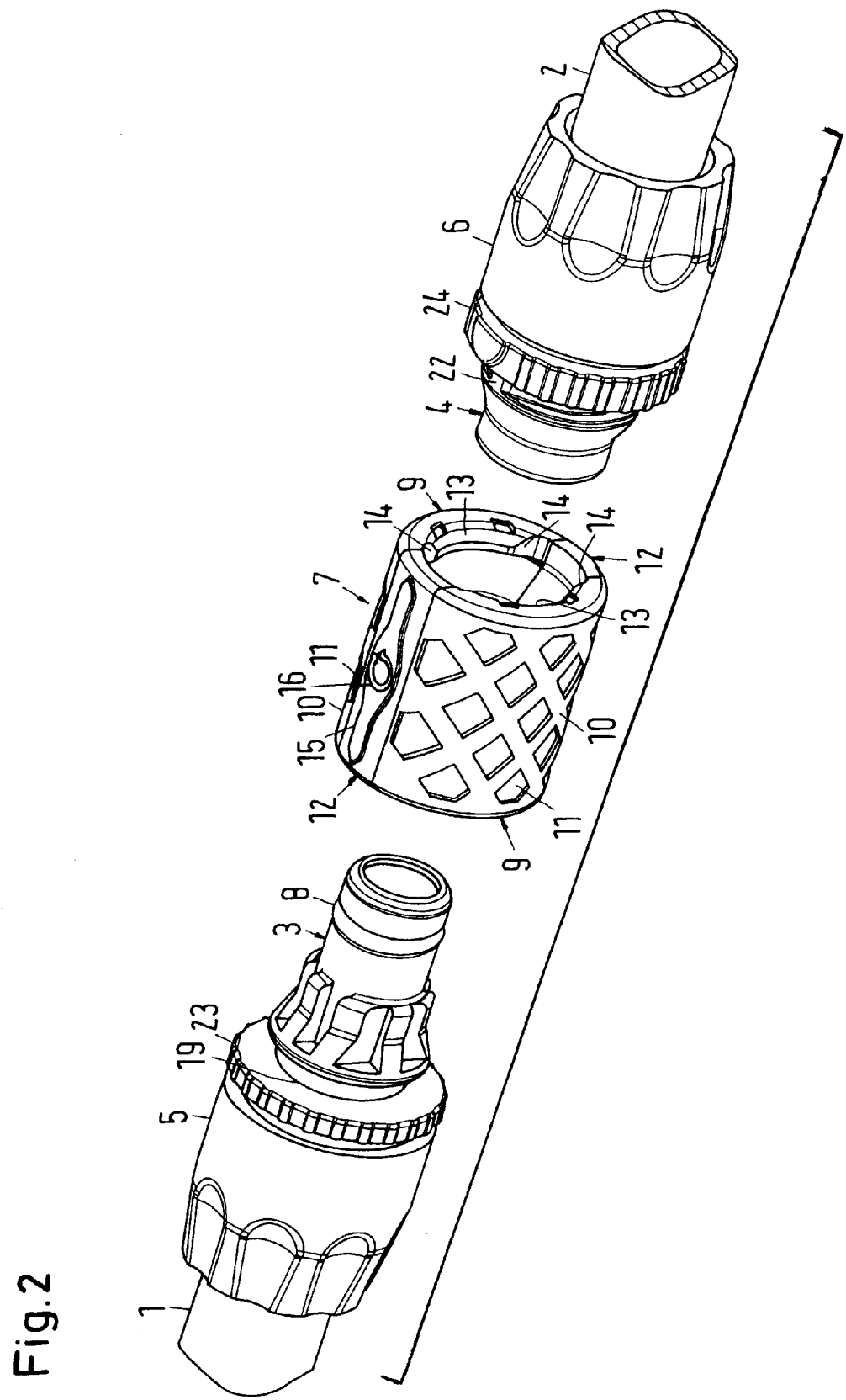
FIG. 2 shows the connecting arrangement according to FIG. 1 in the decoupled state.
Figure 4:
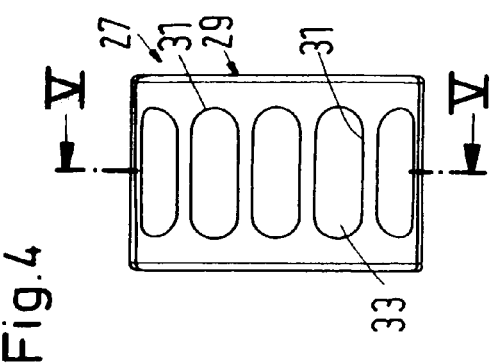
FIG. 4 a side view of the sleeve according to FIG. 3 on a smaller scale.
Figure 7:
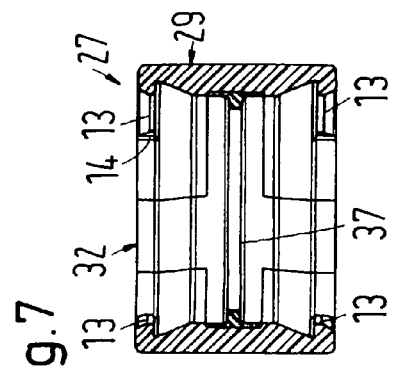
FIG. 7 shows the section VII-VII of FIG. 5.
Figure 5:
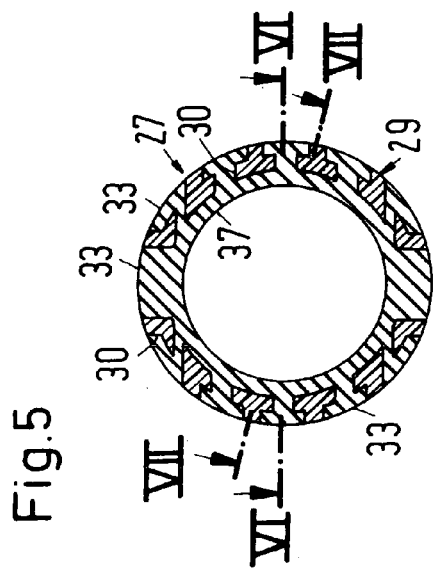
FIG. 5 shows the section V-V of FIG. 4.
Figure 6:
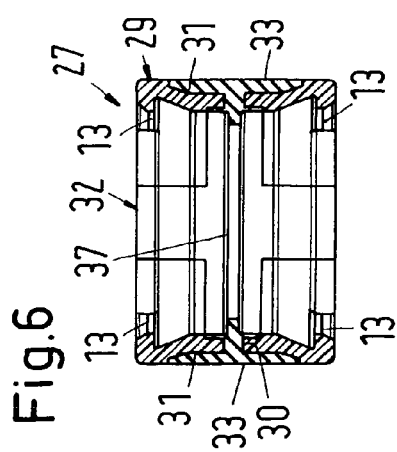
FIG. 6 shows the section VI-VI of FIG. 5.
Figure 3:
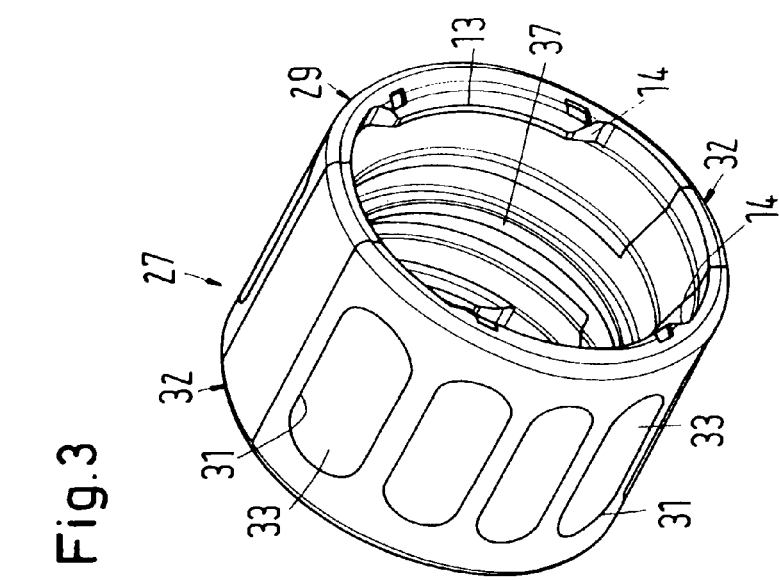
FIG. 3 is a modification of a sleeve of the connecting arrangement according to FIG. 1 in a perspective illustration.

The connecting arrangement according to FIG. 1 and FIG. 2 is comprised of two fluid conduits 1 and 2 (the illustrated embodiment shows conduits in the form of hoses) with end sections 3 and 4; two union nuts 5, 6 connecting the fluid conduits 1, 2 with one of the end sections 3, 4, respectively; a coupling element in the form of a circumferentially closed circular cylindrical sleeve 7; and a sealing ring 8. All parts are comprised of plastic material. However, the end sections 3, 4 and the union nuts 5, 6 can also be made from metal. Instead of connecting the end sections 3, 4 and the fluid conduits 1, 2 to one another by union nuts 5, 6, these parts can also be configured as monolithic parts made of plastic material.

Moreover, at least one of the two end sections 3, 4 can be a pipe socket, for example, the pipe socket connector of a radiator of a motor vehicle that is then connected to a cooling water line in the form of a cooling coil in the interior of the radiator. In this case, the corresponding end section would however be made from metal.

The sleeve 7 is comprised of two sleeve segments that are diametrically opposed to one another relative to the longitudinal axis of the sleeve and made from hard-elastic thermoplastic material, for example, one of the plastic materials polypropylene (PP), polyethylene (PE), polyamide (PA), polybutylene terephthalate (PBT), polyethylene terephthalate (PET), polybutylene naphthalate (PBN), polyethylene naphthalate (PEN), polyoxymethylene (POM), polyethylene sulfide (PPS), polyphenylene amide (PPA), and thermosetting plastic material so that the sleeve segments 9 are bending-resistant. Inserts 10 of elastomer material are injection-molded into the outer side of the sleeve segments 9. The inserts 10 are provided with recesses 11 in order to enhance grip on the sleeve 7. However, the inserts are not mandatory. Instead, the sleeve segments 9 can be corrugated on the outer side. Between the sleeve segments 9 and the inserts 10, elastic sleeve segments 12 made from thermoplastic elastically expandable material can be injection-molded onto the sleeve segments 9 and their inserts 10 so that the sleeve segments 9 and their inserts 10 are connected to the sleeve segments 12 by being fused thereto and the sleeve 7 can be radially widened. The thermoplastic elastically expandable material of the sleeve segments 12 is, for example, one of the plastic materials of thermoplastic elastomer (TPE), vulcanized thermoplastic elastomer (TPV), thermoplastic polyurethane (TPU), thermoplastic ether ester elastomer (TEEE), ethylene propylene (EPDM), fluorinated rubber (FKM), fluorosilicone, liquid silicone rubber (LSR), and ethylene vinyl acetate (EVA). The sleeve segments 9 extend therefore across a circumferential are of the sleeve 7 of less than 180° but more than 80°, preferably about an area of approximately 140° and 160°.

The bending-resistant sleeve segments 9 are provided on their inner side in the vicinity of their ends with securing ribs 13 extending in the circumferential direction and provided on their circumferential ends with slanted flanks 14 (FIG. 2).

The elastic sleeve segments 12 are provided externally with an axially extending projection 15 that has centrally a circular arc shaped double arrow 16 indicating the rotatability of the sleeve 7.

The interior of the sleeve 7 at its axial center is provided with a circumferentially extending stop rib 17 (FIG. 1) whose segments are identified in the area of the elastic sleeve segments 12 by reference numeral 17a and in the area of the hard-elastic sleeve segments 9 by reference numeral 17b. The stop rib segments 17a are comprised therefore of the same material as the elastic sleeve segments 12 and the stop rib segments 17b are comprised of the same material as the hard-elastic sleeve segments 9.

The end sections 3, 4 are provided with circumferentially extending securing ribs 18 about their circumference. For connecting the fluid conduits 1, 2, the end sections 3, 4 are inserted axially into the sleeve 7 and coupled after the sealing ring 8 has been inserted into an annular groove of the end section 3 that is inserted into the end section 4. Upon insertion of the end sections 3, 4 into the sleeve 7 in a predetermined relative angular position relative to the end section 4, the sleeve 7 is radially elastically widened as the securing ribs 13 of the sleeve 7 pass across the securing ribs 18 of the end sections 3, 4 until the securing ribs 13 of the sleeve 7 lock behind the securing ribs 18 of the end sections 3, 4 in a groove 19 or 20 adjoining the securing ribs 18 and extending in the circumferentially direction, respectively. At the same time, the end sections 3, 4 come to rest against the stop rib 17. In order to enable contact of the end section 3 at the stop rib 17, the end section 3 is provided with a shoulder 21. The groove 19 in the end section 3 is a circumferential annular groove. In contrast, the groove 20 in the end section 4 does not extend completely about the circumference but is interrupted by two cams 22 that project by a radial height matching the radial height of the securing rib 18 of the end section 4. The two cams 22 are positioned diametrically opposed to one another relative to the longitudinal center axis of the end section 4 and are provided with slanted flanks. The axial width of the securing ribs 13 of the sleeve 7 corresponds to the axial width of the grooves 19 and 20. Upon insertion of the end sections 3, 4 into the sleeve 7, the securing ribs 13 of the sleeve 7 can therefore also contact the flanges 23, 24 delimiting the grooves 19 and 20 of the end sections 3, 4, respectively. In the coupled state of the connecting arrangement according to FIG. 1, the sleeve segments 12 rest with their ends against the cams 23. For releasing the connection, the sleeve 7 is rotated. When doing so, the securing ribs 13 move with their slanted flanks 14 onto correspondingly slanted flanks of the cams 22 at one end of the bending-resistant sleeve segments 9 and widen the sleeve 7. In this rotational angle position, the sleeve 7 together with the end section 3 and the flexible fluid conduit 1 can be removed from the end section 4.

The sleeve 7 can also be pre-mounted on the end section 3 in the position illustrated in FIG. 1 and, finally, can be coupled with the end section 4 and the fluid conduit 2 connected thereto in an angular position in which the elastic sleeve segments 12 are aligned with the cams 25 in order to connect the fluid conduits 1, 2 with one another. The stop rib 17 not only provides a limitation for the insertion depth of the end sections 3, 4 into the sleeve 7 but also a sealing action at the connecting location of the end sections 3, 4 in addition to the sealing action of the sealing ring 8.

The flanges 23, 24 are provided with ribs so that they provide enhanced grip in order to be able to hold the end sections 3, 4 safely when rotating the sleeve 7.

FIGS. 3 to 7 represent a sleeve 27 that is modified somewhat relative to the sleeve 7 according to FIG. 1 and FIG. 2. The parts of the sleeve 27 that resemble those of the sleeve 7 are identified by reference numerals increased by 20 relative to the corresponding parts of the sleeve 7; the same parts have the same reference numerals.

A circumferentially extending stop rib 37 of the same thermoplastic elastic material as that used for the elastic sleeve segments 32 is injection-molded onto the inner side of the bending-resistant sleeve segments 9 and the elastic sleeve segments 32. At the same time, the elastic material of the stop rib 37 is injection-molded through openings 30 provided in the bending-resistant sleeve segments 29 into recesses 31 provided in the bending-resistant sleeve segments 29 so that the exterior side of the sleeve segments 29 provide grip-enhancing surfaces 23 for facilitating manual rotation of the sleeve 27.

The circumferentially extending elastic stop rib 37 has the advantage that it better seals the connecting location of the end sections 3, 4 than the sections of the stop rib 17 provided in the area of the bending resistant sleeve segments 9 of the sleeve 7 and made of the same harder material as the sleeve segments 9; the stop rib 17 is comprised only in the area of the elastic sleeve segments 12 of the same elastic material as the sleeve segments 12.

FIGS. 8 to 12 show a sleeve 47 that is another modification of the sleeve 7 according to FIGS. 1 and 2. The parts of the sleeve 47 that resemble those of the sleeve 7 are identified by reference numerals increased by 30 relative to the corresponding parts of sleeve 7; the same parts have the same reference numerals.

In deviation from the sleeve 7 according to FIGS. 1 and 2, the elastic sleeve segments 42 are provided with lateral projections 43 that are injection-molded into recesses of the hard-elastic sleeve segments 39 and are fused to the sleeve segments 39. The projections 43 increase the strength of the connection of the elastic sleeve segments 42 with the hard-elastic sleeve segments 39. The projection 15 of elastic sleeve segments 12 of the sleeve 7 according to FIGS. 1 and 2 has been omitted because the elastic material of the sleeve segments 42 can be selected such that it enhances grip sufficiently. For example, silicone rubber can be used.

In FIGS. 13 to 16 a sleeve 57 modified relative to sleeve 7 according to FIG. 1 and FIG. 2 is illustrated. The parts of the sleeve 57 that resemble those of the sleeve 7 are identified by reference numerals increased by 50 relative to the corresponding parts of sleeve 7; the same parts have the same reference numerals.

Sleeve 57 is comprised about its entire circumference of a monolithic part of hard-elastic material, for example, hard rubber or reinforced and/or vulcanized thermoplastic elastomer. The securing ribs 18 of the sleeve segments 9 (the latter are monolithic parts of the sleeve segments 12) extends across approximately 80 E to 100 E in the circumferentially direction of the sleeve 57, preferably about approximately 90 E. Accordingly, the sleeve segments 9 are less elastically expandable then the thinner sleeve segments 12 so that the sleeve 57 can still be expanded or widened. In addition to the projection 15, the sleeve 57 is provided with axial ribs 56 that are distributed about the circumference in order to enhance grip on the sleeve 57.

Figure 17:
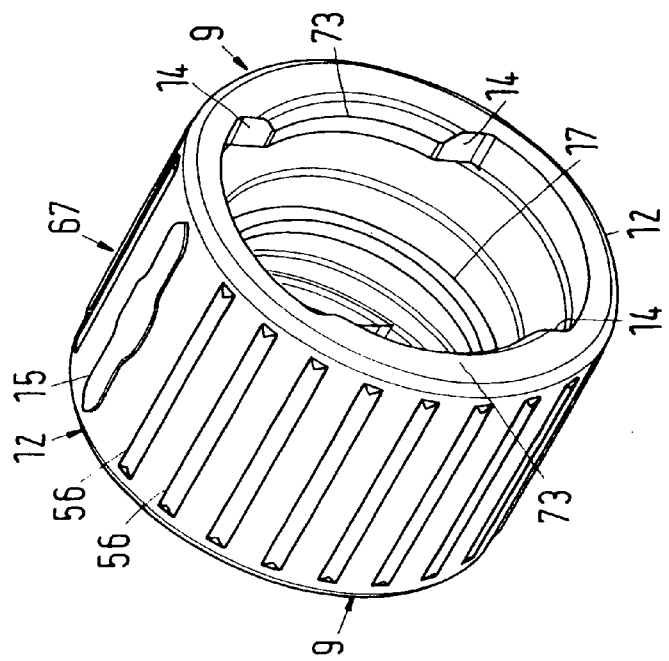
FIG. 17 is a perspective view of another modification of sleeve according to FIG. 1.
Figure 18:
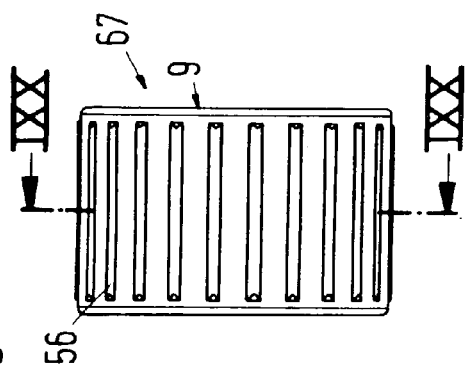
FIG. 18 is a side view of the sleeve according to FIG. 17 on a smaller scale.
Figure 19:
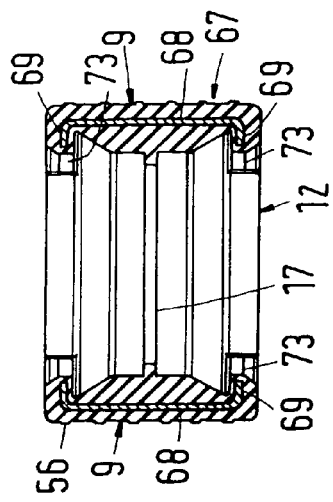
FIG. 19 shows the section IXX-IXX of FIG. 18.

FIGS. 17 to 19 represent another sleeve 67 as a modification of the sleeve 7 according to FIG. 1 and FIG. 2. The parts of the sleeve 67 that resemble those of the sleeve 7 are identified by reference numerals increased by 60 relative to the corresponding parts of sleeve 7; the same parts have the same reference numerals.

The sleeve 67, including its securing ribs 13 and stop rib 17 has about its entire circumference the same elastically expandable material as the sleeve segments 12 of the sleeve 7 according to FIGS. 1 and 2. In the circumferential area of the securing ribs 13, however, a cylindrical part 68 made of metal or the same hard-elastic plastic material as the sleeve segments 9 according to FIG. 1 and FIG. 2 is embedded. The cylinder parts 68 have at their circumferential edges inwardly projecting legs 69 that project into the securing rib 73. The legs 69 can also be interrupted in the circumferential direction.

While specific embodiments of the invention have been shown and described in detail to illustrate the inventive principles, it will be understood that the invention may be embodied otherwise without departing from such principles.

What is claimed is:

1. A connecting arrangement comprising:
   end sections of two fluid conduits to be connected to one another;
   a coupling element having an axis and an outer side surrounding the axis and an inner side surrounding the axis;
   wherein on a circumference of the end sections first securing ribs extending in the circumferential direction are provided, respectively;
   wherein on the inner side of the coupling element second securing ribs extending in the circumferential direction are provided proximal to each axial end of the coupling element;

wherein the coupling element is coaxially coupled to the end sections in the coupled state of the connecting arrangement by being elastically expanded, wherein the second securing ribs lock behind the first securing ribs and the end sections are coupled seal-tightly with one another;

wherein the coupling element is a circular cylindrical sleeve that has an outer circumferential surface that is completely closed circumferentially so as to provide protection for connection locations of the end sections, wherein on the inner side of the sleeve a stop rib is provided that extends circumferentially and limits an insertion depth of the end sections, wherein one of the end sections has a free end that rests against the stop rib and wherein the other one of the end sections has a shoulder resting against the stop rib, wherein the rib comprises elastically expandable material and is a monolithic part of the elastic sleeve segments, wherein the bending-resistant sleeve segments have an outer side provided with recesses in which recesses an elastically expandable material is arranged.

2. The connecting arrangement according to claim 1, wherein the stop rib is comprised of rib segments that are formed as monolithic parts of the bending-resistant sleeve segments and rib segments that are formed as monolithic parts of the elastic sleeve segments.

3. The connecting arrangement according to claim 1, wherein the stop rib comprising an elastically expandable material is connected monolithically through openings provided in the bending-resistant sleeve segments to the elastically expandable material in the recesses.

4. The connecting arrangement according to claim 1, wherein the second securing ribs extend about at least 80° and less than 180°.

5. The connecting arrangement according to claim 1, wherein behind the first securing ribs grooves extending in the circumferential direction of the end sections are provided, wherein the grooves have an axial width matching an axial width of the second securing ribs.

6. A connecting arrangement comprising:

end sections of two fluid conduits to be connected to one another;

a coupling element having an axis and an outer side surrounding the axis and an inner side surrounding the axis;

wherein on a circumference of the end sections first securing ribs extending in the circumferential direction are provided, respectively;

wherein on the inner side of the coupling element second securing ribs extending in the circumferential direction are provided proximal to each axial end of the coupling element;

wherein the coupling element is coaxially coupled to the end sections in the coupled state of the connecting arrangement by being elastically expanded, wherein the second securing ribs lock behind the first securing ribs and the end sections are coupled seal-tightly with one another;

wherein the coupling element is a circular cylindrical sleeve that has an outer circumferential surface that is completely closed circumferentially, wherein the sleeve has bending-resistant sleeve segments extending across at least 80° and less than 180° in the circumferential direction, wherein the sleeve has elastic sleeve segments that are made from elastically expandable material, and wherein the elastic sleeve segments are connected to facing edges of the bending-resistant sleeve segments by being fused to the facing edges or by forming a monolithic part with the bending-resistant sleeve segments.

* * * * *